(12) United States Patent
Tu et al.

(10) Patent No.: US 8,892,393 B2
(45) Date of Patent: Nov. 18, 2014

(54) METHOD AND SYSTEM FOR OBJECT LOCATION DETECTION IN A SPACE

(75) Inventors: Yen-Hung Tu, Taipei (TW); Chung-Lin Chia, Zhongli (TW); Han-Chang Chen, New Taipei (TW); Wen-Chieh Pan, New Taipei (TW)

(73) Assignee: Rich IP Technology Inc., Taipei (TW)

( * ) Notice: Subject to any disclaimer, the term of this patent is extended or adjusted under 35 U.S.C. 154(b) by 487 days.

(21) Appl. No.: 13/356,377

(22) Filed: Jan. 23, 2012

(65) Prior Publication Data

US 2013/0138387 A1    May 30, 2013

(30) Foreign Application Priority Data

Nov. 25, 2011   (TW) .............................. 100143385 A

(51) Int. Cl.
*G01B 7/14*       (2006.01)
*G01B 21/16*    (2006.01)
*G06F 3/041*    (2006.01)

(52) U.S. Cl.
CPC ...................................... *G06F 3/041* (2013.01)
USPC ............ 702/150; 345/158; 702/152; 702/155

(58) Field of Classification Search
CPC ....... G06F 3/041; G06F 3/0325; G01B 11/24; G01B 11/25; G01B 11/2513; G01S 17/48; G01S 17/89; H04N 13/00
USPC .............. 702/47, 95, 150, 152, 155; 345/158, 345/419
See application file for complete search history.

(56) References Cited

U.S. PATENT DOCUMENTS 8,139,029 B2 * 3/2012 Boillot et al. ................. 345/158
2013/0120361 A1 * 5/2013 Wang et al. ................... 345/419

* cited by examiner

*Primary Examiner* — John H Le
(74) *Attorney, Agent, or Firm* — Tracy M. Heims; Apex Juris, pllc

(57) ABSTRACT

A method and system for object location detection in a space, the method including the steps of: configuring the resolution of a multi dimensional sensing apparatus to divide a multi dimensional space into M first sub spaces; scanning the multi dimensional space to generate M first sensed data and at least one first locked space; configuring the resolution of the multi dimensional sensing apparatus to divide each of the at least one first locked space into N second sub spaces; scanning the at least one first locked space to generate at least one group of second sensed data and at least one second locked space; and combining at least one of the M first sensed data that corresponds to the at least one first locked space, with the at least one group of second sensed data to form a set of output sensed data.

24 Claims, 4 Drawing Sheets

METHOD AND SYSTEM FOR OBJECT LOCATION DETECTION IN A SPACE

BACKGROUND OF THE INVENTION

1. Field of the Invention

The present invention relates to a method for object location detection, especially to a method which uses a multi dimensional sensing apparatus to detect the location of at least one object in a space.

2. Description of the Related Art

Prior art methods for detecting the location of an object in a space generally use a plurality of sensing apparatuses to scan repeatedly a multi dimensional space with a fixed resolution. However, when the multi dimensional space becomes large, the scanning time thereof will grow accordingly. If the scanning time becomes too long, detection failure for a motion trace of the object can happen; if the resolution is reduced for shortening the scanning time, the discrimination of neighboring objects can fail. What is more, when the multi dimensional space grows large, the response time of each of the sensing apparatuses is prone to lengthening due to the growing of the volume of data to be processed, causing the sensing apparatuses unable to keep up with the motion speed of the object.

Besides, when an object is moving in a background, the data volume corresponding to the background can be by far larger than that corresponding to the object. At instances where only the information of the moving object is needed, the whole process of data manipulation of the prior art methods will be lack of efficiency.

To solve the foregoing problems, a novel and efficient method for object location detection in a space is needed.

SUMMARY OF THE INVENTION

One objective of the present invention is to disclose a method for object location detection in a space, which is capable of getting multiple sets of sensed data of different resolutions by configuring a multi dimensional sensing apparatus, and using the multi dimensional sensing apparatus to combine the multiple sets of sensed data of different resolutions to form a set of output sensed data.

Another objective of the present invention is to disclose a method for object location detection in a space, which is capable of using a multi dimensional sensing apparatus to perform an averaging operation on multiple sets of sensed data to promote the signal-to-noise ratio of the sensed data.

Another objective of the present invention is to disclose a method for object location detection in a space, which is capable of using a multi dimensional sensing apparatus to perform a comparison procedure to convert a set of output sensed data into a characteristic table, and perform a location prediction procedure to determine the scan space for next detection process according to the characteristic table.

Another objective of the present invention is to disclose a method for object location detection in a space, which is capable of using a multi dimensional sensing apparatus to perform a subtraction operation to convert two characteristic tables into a motion indication table so as to get rid of data sensed in a static background, and perform a location prediction procedure to determine the scan space for next detection process according to the motion indication table.

Another objective of the present invention is to disclose a system for object location detection in a space, which is capable of getting multiple sets of sensed data of different resolutions by configuring a multi dimensional sensing apparatus, and using the multi dimensional sensing apparatus to combine the multiple sets of sensed data of different resolutions to form a set of output sensed data.

Another objective of the present invention is to disclose a system for object location detection in a space, which is capable of using a multi dimensional sensing apparatus to perform an averaging operation on multiple sets of sensed data to promote the signal-to-noise ratio of the sensed data.

Another objective of the present invention is to disclose a system for object location detection in a space, which is capable of using a multi dimensional sensing apparatus to perform a comparison procedure to convert a set of output sensed data into a characteristic table, and perform a location prediction procedure to determine the scan space for next detection process according to the characteristic table.

Still another objective of the present invention is to disclose a system for object location detection in a space, which is capable of using a multi dimensional sensing apparatus to perform a subtraction operation to convert two characteristic tables into a motion indication table so as to get rid of data sensed in a static background, and perform a location prediction procedure to determine the scan space for next detection process according to the motion indication table.

To attain the foregoing objectives, a method for object location detection in a space is disclosed, the method including the steps of:

configuring the resolution of a multi dimensional sensing apparatus to divide a multi dimensional space into M first sub spaces, wherein M is a positive integer;

using the multi dimensional sensing apparatus to scan the multi dimensional space to generate M first sensed data, which correspond to M first sensed values generated by the multi dimensional sensing apparatus in scanning the M first sub spaces; and performing a first comparison operation on the M first sensed data to locate at least one first locked space in the M first sub spaces;

configuring the resolution of the multi dimensional sensing apparatus to divide each of the at least one first locked space into N second sub spaces, wherein N is a positive integer;

using the multi dimensional sensing apparatus to scan each of the at least one first locked space to generate at least one group of second sensed data, each group of the at least one group of second sensed data including N data, which correspond to N second sensed values generated by the multi dimensional sensing apparatus in scanning the N second sub spaces in one of the at least one first locked space; and performing a second comparison operation on each group of the at least one group of second sensed data to locate at least one second locked space in each of the at least one first locked space; and using the multi dimensional sensing apparatus to combine at least one of the M first sensed data that corresponds to the at least one first locked space, with the at least one group of second sensed data to form a set of output sensed data.

Wherein, the multi dimensional sensing apparatus is one selected from a group consisting of capacitive touch sensor apparatus, optical image sensing apparatus, radio image sensing apparatus, acoustic wave sensing apparatus, electromagnetic sensing apparatus, piezoelectrical sensing apparatus, thermal sensing apparatus, signal interruption sensing apparatus, switch array type sensing apparatus, and any combination thereof.

Preferably, each of the M first sensed values is an average of J sensed values generated by the multi dimensional sensing apparatus in scanning one of the M first sub spaces J times, wherein J is a positive integer.

Preferably, each of the N second sensed values is an average of K sensed values generated by the multi dimensional sensing apparatus in scanning one of the N second sub spaces K times, wherein K is a positive integer.

In one embodiment, the first comparison operation uses a first reference value to compare with each of the M first sensed data, so that when the numerical value of one of the M first sensed data is greater than the first reference value, a corresponding one of the M first sub spaces is defined as the first locked space; and the second comparison operation uses a second reference value to compare with each of the N second sensed data, so that when the numerical value of one of the N second sensed data is greater than the second reference value, a corresponding one of the N second sub spaces is defined as the second locked space.

In another embodiment, the first comparison operation compares each pair of two adjacent ones of the M first sensed data to find a first extreme value, and designate one of the M first sub spaces that corresponds to the first extreme value, as the first locked space, wherein the first extreme value can be the maximum or the minimum among the M first sensed data; and the second comparison operation compares each pair of two adjacent ones of the N second sensed data to find a second extreme value, and designate one of the N second sub spaces that corresponds to the second extreme value, as the second locked space, wherein the second extreme value can be the maximum or the minimum among the N second sensed data.

In one embodiment, the method for object location detection in a space further includes the steps of:

using a threshold to perform a comparison procedure on a set of the output sensed data to generate a characteristic table, which has at least one characteristic data, and determine at least one space as the multi dimensional space according to the at least one characteristic data; and transmitting a set of output data to a central processing unit, wherein the output data is selected from a group consisting of coordinate data, the output sensed data, and the characteristic table.

In another embodiment, the method for object location detection in a space further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining at least one space as the multi dimensional space according to the at least one first characteristic data and the at least one second characteristic data; and transmitting a set of output data to a central processing unit, wherein the output data is selected from a group consisting of coordinate data, the output sensed data, the characteristic table, and the motion indication table.

In still another embodiment, the method for object location detection in a space further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining a vector according to the at least one first characteristic data and the at least one second characteristic data;

generating a difference vector according to two consecutive ones of the vectors;

generating at least one predicted location according to a combination of the at least one second characteristic data, the vector, and the difference vector;

determining at least one space as the multi dimensional space according to the at least one predicted location; and transmitting a set of output data to a central processing unit, wherein the output data is selected from a group consisting of coordinate data, the output sensed data, the characteristic table, the motion indication table, and the difference vector.

To attain the foregoing objectives, another method for object location detection in a space is disclosed, the method including the steps of:

configuring the resolution of a multi dimensional sensing apparatus to divide a multi dimensional space into M first sub spaces, wherein M is a positive integer;

using the multi dimensional sensing apparatus to scan the multi dimensional space to generate M first sensed data, which correspond to M first sensed values generated by the multi dimensional sensing apparatus in scanning the M first sub spaces; and performing a first comparison operation on the M first sensed data to locate at least one first locked space in the M first sub spaces, wherein each of the M first sensed values is an average of J sensed values generated by the multi dimensional sensing apparatus in scanning one of the M first sub spaces J times, wherein J is a positive integer;

configuring the resolution of the multi dimensional sensing apparatus to divide each of the at least one first locked space into N second sub spaces, wherein N is a positive integer;

using the multi dimensional sensing apparatus to scan each of the at least one first locked space to generate at least one group of second sensed data, each group of the at least one group of second sensed data including N data, which correspond to N second sensed values generated by the multi dimensional sensing apparatus in scanning the N second sub spaces in one of the at least one first locked space; and performing a second comparison operation on each group of the at least one group of second sensed data to locate at least one second locked space in each of the at least one first locked space, wherein each of the N second sensed values is an average of K sensed values generated by the multi dimensional sensing apparatus in scanning one of the N second sub spaces K times, wherein K is a positive integer; and using the multi dimensional sensing apparatus to combine at least one of the M first sensed data that corresponds to the at least one first locked space, with the at least one group of second sensed data to form a set of output sensed data.

Wherein, the multi dimensional sensing apparatus is one selected from a group consisting of capacitive touch sensor apparatus, optical image sensing apparatus, radio image sensing apparatus, acoustic wave sensing apparatus, electromagnetic sensing apparatus, piezoelectrical sensing apparatus, thermal sensing apparatus, signal interruption sensing apparatus, switch array type sensing apparatus, and any combination thereof.

In one embodiment, the first comparison operation uses a first reference value to compare with each of the M first sensed data, so that when the numerical value of one of the M first sensed data is greater than the first reference value, a corresponding one of the M first sub spaces is defined as the first locked space; and the second comparison operation uses a second reference value to compare with each of the N second sensed data, so that when the numerical value of one of the N second sensed data is greater than the second reference value, a corresponding one of the N second sub spaces is defined as the second locked space.

In another embodiment, the first comparison operation compares each pair of two adjacent ones of the M first sensed data to find a first extreme value, and designate one of the M first sub spaces that corresponds to the first extreme value, as the first locked space, wherein the first extreme value can be the maximum or the minimum among the M first sensed data; and the second comparison operation compares each pair of two adjacent ones of the N second sensed data to find a second extreme value, and designate one of the N second sub spaces that corresponds to the second extreme value, as the second locked space, wherein the second extreme value can be the maximum or the minimum among the N second sensed data.

In one embodiment, the method for object location detection in a space further includes the steps of:

using a threshold to perform a comparison procedure on a set of the output sensed data to generate a characteristic table, which has at least one characteristic data, and determine at least one space as the multi dimensional space according to the at least one characteristic data; and transmitting a set of output data to a central processing unit, wherein the output data is selected from a group consisting of coordinate data, the output sensed data, and the characteristic table.

In another embodiment, the method for object location detection in a space further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining at least one space as the multi dimensional space according to the at least one first characteristic data and the at least one second characteristic data; and transmitting a set of output data to a central processing unit, wherein the output data is selected from a group consisting of coordinate data, the output sensed data, the characteristic table, and the motion indication table.

In still another embodiment, the method for object location detection in a space further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining a vector according to the at least one first characteristic data and the at least one second characteristic data;

generating a difference vector according to two consecutive ones of the vectors;

generating at least one predicted location according to a combination of the at least one second characteristic data, the vector, and the difference vector;

determining at least one space as the multi dimensional space according to the at least one predicted location; and transmitting a set of output data to a central processing unit, wherein the output data is selected from a group consisting of coordinate data, the output sensed data, the characteristic table, the motion indication table, and the difference vector.

To attain the foregoing objectives, a system for object location detection in a space is disclosed, the system including:

a multi dimensional sensing module;

a driver unit, coupled with the multi dimensional sensing module; and a control unit, coupled with the driver unit;

wherein the control unit is used for executing a program to drive the multi dimensional sensing module via the driver unit, to implement a method for object location detection in a space, which includes the steps of:

configuring the resolution of the multi dimensional sensing module to divide a multi dimensional space into M first sub spaces, wherein M is a positive integer;

scanning the multi dimensional space to generate M first sensed data, which correspond to M first sensed values generated by the multi dimensional sensing module in scanning the M first sub spaces; and performing a first comparison operation on the M first sensed data to locate at least one first locked space in the M first sub spaces, wherein each of the M first sensed values is an average of J sensed values generated by the multi dimensional sensing module in scanning one of the M first sub spaces J times, wherein J is a positive integer;

configuring the resolution of the multi dimensional sensing module to divide each of the at least one first locked space into N second sub spaces, wherein N is a positive integer;

scanning each of the at least one first locked space to generate at least one group of second sensed data, each group of the at least one group of second sensed data including N data, which correspond to N second sensed values generated by the multi dimensional sensing module in scanning the N second sub spaces in one of the at least one first locked space; and performing a second comparison operation on each group of the at least one group of second sensed data to locate at least one second locked space in each of the at least one first locked space, wherein each of the N second sensed values is an average of K sensed values generated by the multi dimensional sensing module in scanning one of the N second sub spaces K times, wherein K is a positive integer; and combining at least one of the M first sensed data that corresponds to the at least one first locked space, with the at least one group of second sensed data to form a set of output sensed data.

Wherein, the multi dimensional sensing module is one sensing module selected from a group consisting of capacitive touch sensor module, optical image sensing module, radio image sensing module, acoustic wave sensing module, electromagnetic sensing module, piezoelectrical sensing module, thermal sensing module, signal interruption sensing module, switch array type sensing module, and any combination thereof.

Preferably, the driver unit includes:

an array configuring circuit, coupled with the multi dimensional sensing module;

an array configuration control circuit, coupled between the array configuring circuit and the control unit; and a signal conversion unit, coupled between the array configuring circuit and the control unit for outputting the first sensed value and the second sensed value.

Preferably, the control unit includes:

a micro processing unit, coupled with the driver unit;

a program memory, coupled with the micro processing unit; and a register unit, coupled with the micro processing unit for storing a plurality of the first sensed values, a plurality of the second sensed values, and a plurality of the output sensed data.

In one embodiment, the first comparison operation uses a first reference value to compare with each of the M first sensed data, so that when the numerical value of one of the M first sensed data is greater than the first reference value, a corresponding one of the M first sub spaces is defined as the first locked space; and the second comparison operation uses a second reference value to compare with each of the N second sensed data, so that when the numerical value of one of the N second sensed data is greater than the second reference value, a corresponding one of the N second sub spaces is defined as the second locked space.

In another embodiment, the first comparison operation compares each pair of two adjacent ones of the M first sensed data to find a first extreme value, and designate one of the M first sub spaces that corresponds to the first extreme value, as the first locked space, wherein the first extreme value can be the maximum or the minimum among the M first sensed data; and the second comparison operation compares each pair of two adjacent ones of the N second sensed data to find a second extreme value, and designate one of the N second sub spaces that corresponds to the second extreme value, as the second locked space, wherein the second extreme value can be the maximum or the minimum among the N second sensed data.

In one embodiment, the method for object location detection in a space using the control unit further includes the steps of:

using a threshold to perform a comparison procedure on a set of the output sensed data to generate a characteristic table, which has at least one characteristic data, and determine at least one space as the multi dimensional space according to the at least one characteristic data; and transmitting a set of output data to a central processing unit, wherein the output data is selected from a group consisting of coordinate data, the output sensed data, and the characteristic table.

In another embodiment, the method for object location detection in a space using the control unit further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining at least one space as the multi dimensional space according to the at least one first characteristic data and the at least one second characteristic data; and transmitting a set of output data to a central processing unit, wherein the output data is selected from a group consisting of coordinate data, the output sensed data, the characteristic table, and the motion indication table.

In still another embodiment, the method for object location detection in a space using the control unit further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining a vector according to the at least one first characteristic data and the at least one second characteristic data;

generating a difference vector according to two consecutive ones of the vectors;

generating at least one predicted location according to a combination of the at least one second characteristic data, the vector, and the difference vector;

determining at least one space as the multi dimensional space according to the at least one predicted location; and transmitting a set of output data to a central processing unit, wherein the output data is selected from a group consisting of coordinate data, the output sensed data, the characteristic table, the motion indication table, and the difference vector.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 3(a) illustrates how the motion indication table of the present invention is generated by a subtraction operation on two consecutive ones of the characteristic tables according to a scenario.

FIG. 3(b) illustrates how the motion indication table of the present invention is generated by a subtraction operation on two consecutive ones of the characteristic tables according to another scenario.

FIG. 3(c) illustrates how the motion indication table of the present invention is generated by a subtraction operation on two consecutive ones of the characteristic tables according to still another scenario.

DETAILED DESCRIPTION OF THE PREFERRED EMBODIMENTS

The present invention will be described in more detail hereinafter with reference to the accompanying drawings that show the preferred embodiments of the invention.

Figure 1:
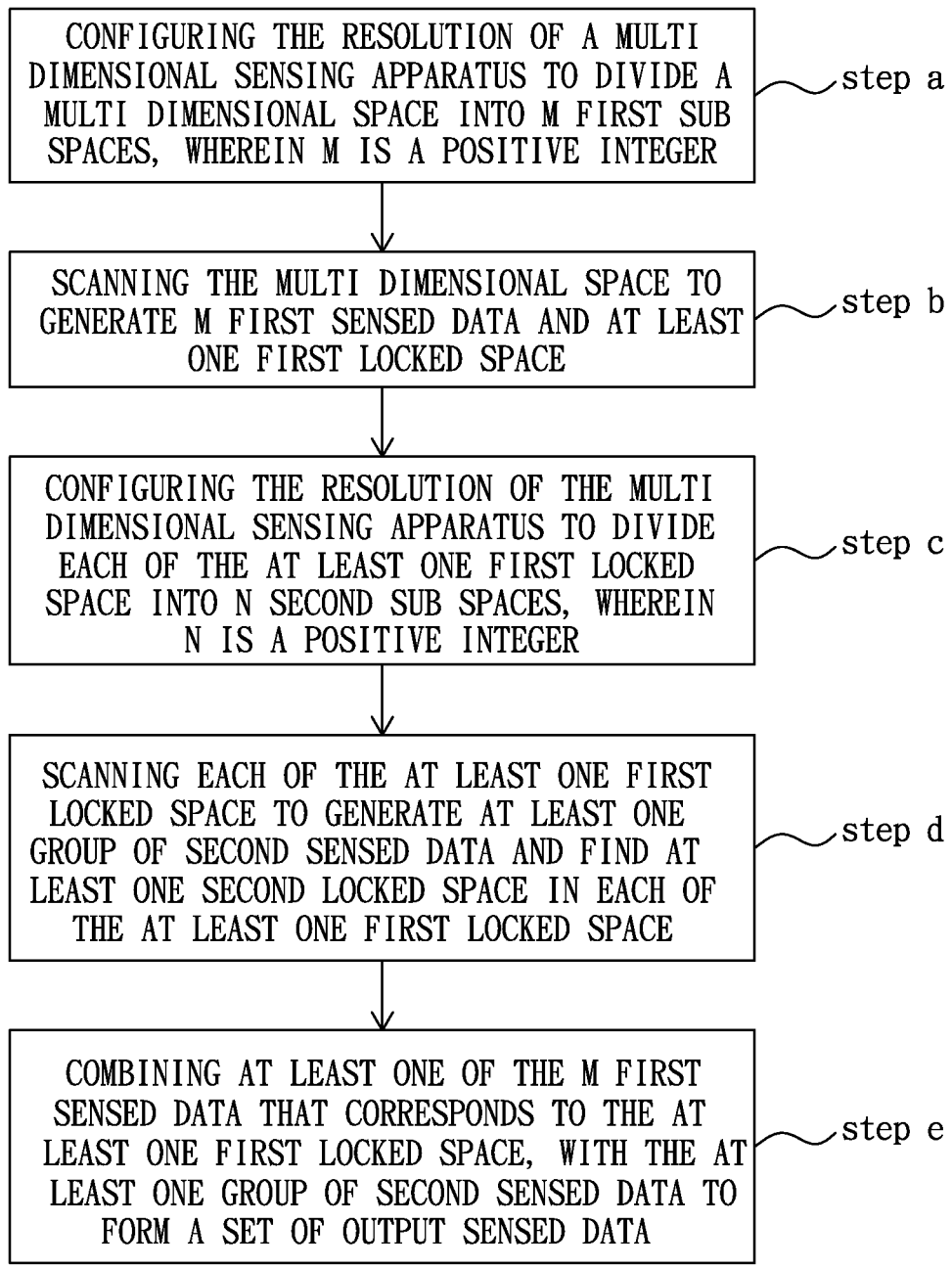
FIG. 1 illustrates a flow chart of the method for object location detection in a space according to a preferred embodiment of the present invention.

Please refer to FIG. 1, which illustrates a flow chart of the method for object location detection in a space according to a preferred embodiment of the present invention. As illustrated in FIG. 1, the method includes the steps of: configuring the resolution of a multi dimensional sensing apparatus to divide a multi dimensional space into M first sub spaces, wherein M is a positive integer (step a); scanning the multi dimensional space to generate M first sensed data and at least one first locked space (step b); configuring the resolution of the multi dimensional sensing apparatus to divide each of the at least one first locked space into N second sub spaces, wherein N is a positive integer (step c); scanning each of the at least one first locked space to generate at least one group of second sensed data and find at least one second locked space in each of the at least one first locked space (step d); and combining at least one of the M first sensed data that corresponds to the at least one first locked space, with the at least one group of second sensed data to form a set of output sensed data. (step e).

In step a, the multi dimensional sensing apparatus is one selected from a group consisting of capacitive touch sensor apparatus, optical image sensing apparatus, radio image sensing apparatus, acoustic wave sensing apparatus, electromagnetic sensing apparatus, piezoelectrical sensing apparatus, thermal sensing apparatus, signal interruption sensing apparatus, switch array type sensing apparatus, and any combination thereof. When M is set at 1, the whole multi dimensional space corresponds to a single location.

In step b, the M first sensed data correspond to M first sensed values generated by the multi dimensional sensing apparatus in scanning the M first sub spaces, wherein each of the M first sensed values is an average of J sensed values generated by the multi dimensional sensing apparatus in scanning one of the M first sub spaces J times, wherein J is a positive integer. The at least one first locked space in the M first sub spaces is determined by performing a first comparison operation on the M first sensed values, wherein one embodiment of the first comparison operation uses a first reference value to compare with each of the M first sensed data, so that when the numerical value of one of the M first sensed data is greater than the first reference value, a corresponding one of the M first sub spaces is defined as the first locked space. Another embodiment of the first comparison operation compares each pair of two adjacent ones of the M first sensed data to find an extreme value, and designate one of the M first sub spaces that corresponds to the extreme value, as the first locked space, wherein the extreme value can be the maximum or the minimum among the M first sensed data.

In step c, the at least one first locked space is further divided.

In step d, each group of the at least one group of second sensed data has N data which correspond to N second sensed values generated by the multi dimensional sensing apparatus in scanning the N second sub spaces in one of the at least one first locked space, wherein each of the N second sensed values is an average of K sensed values generated by the multi dimensional sensing apparatus in scanning one of the N second sub spaces K times, wherein K is a positive integer. The at least one second locked space in each of the at least one first locked space is determined by performing a second comparison operation on each group of the at least one group of second sensed data, wherein one embodiment of the second comparison operation uses a second reference value to compare with each of the N second sensed data, so that when the numerical value of one of the N second sensed data is greater than the second reference value, a corresponding one of the N second sub spaces is defined as the second locked space. Another embodiment of the second comparison operation compares each pair of two adjacent ones of the N second sensed data to find an extreme value, and designate one of the N second sub spaces that corresponds to the extreme value, as the second locked space, wherein the extreme value can be the maximum or the minimum among the N second sensed data.

Figures 2A, 2B, 2C, 2D:
FIG. 2(a)-2(d) illustrate the application of the present invention's method for object location detection in a 4×4 two-dimension space.

In step e, the set of output sensed data stands for an output table, which carries at least one characteristic data to indicate at least one object. To facilitate the understanding of the technology of the present invention, a space of two dimensions is used for illustration. Please refer to FIG. 2(a)-2(d), which illustrate the application of the present invention's method for object location detection in a 4×4 two-dimension space. As illustrated in FIG. 2(a), there are two objects—each indicated by X—in the 4×4 two-dimension space. As illustrated in FIG. 2(b), the present invention configures the 4×4 two-dimension space as 2×2 first sub spaces for object detection and get a set of first sensed data; and uses "1" as the first reference value (not shown in the figure) to perform the first comparison operation to generate two first locked spaces. As illustrated in FIG. 2(c), the present invention then configures each of the two locked first space as 2×2 second sub spaces for object detection and gets two groups of second sensed data; and uses "1" as the second reference value (not shown in the figure) to perform the second comparison operation to generate two second locked spaces. As illustrated in FIG. 2(d), the present invention combines two blocks of the set of first sensed data that correspond to the two first locked space, with the two groups of second sensed data to form a set of output sensed data.

In another embodiment, the method for object location detection as illustrated in FIG. 1 further includes the steps of:

using a threshold to perform a comparison procedure on a set of the output sensed data to generate a characteristic table, which has at least one characteristic data, and determine at least one space as the multi dimensional space according to the at least one characteristic data; and transmitting a set of output data to a central processing unit, wherein the output data is selected from a group consisting of coordinate data, the output sensed data, and the characteristic table.

Take the set of output sensed data in FIG. 2(d) as an example. With the threshold set at 3, "5" is the characteristic data. The multi dimensional space can therefore be determined according to the locations of "5"—for example, take the blocks of 3×3 with "5" at center as the multi dimensional space for next scan—to increase scan efficiency.

In still another embodiment, the method for object location detection as illustrated in FIG. 1 further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining at least one space as the multi dimensional space according to the at least one first characteristic data and the at least one second characteristic data; and transmitting a set of output data to a central processing unit, wherein the output data is selected from a group consisting of coordinate data, the output sensed data, the characteristic table, and the motion indication table.

Besides, the generation of the motion indication table can also be done by the central processing unit to relieve the workload of the multi dimensional sensing apparatus.

Figures 3A, 3B, 3C:
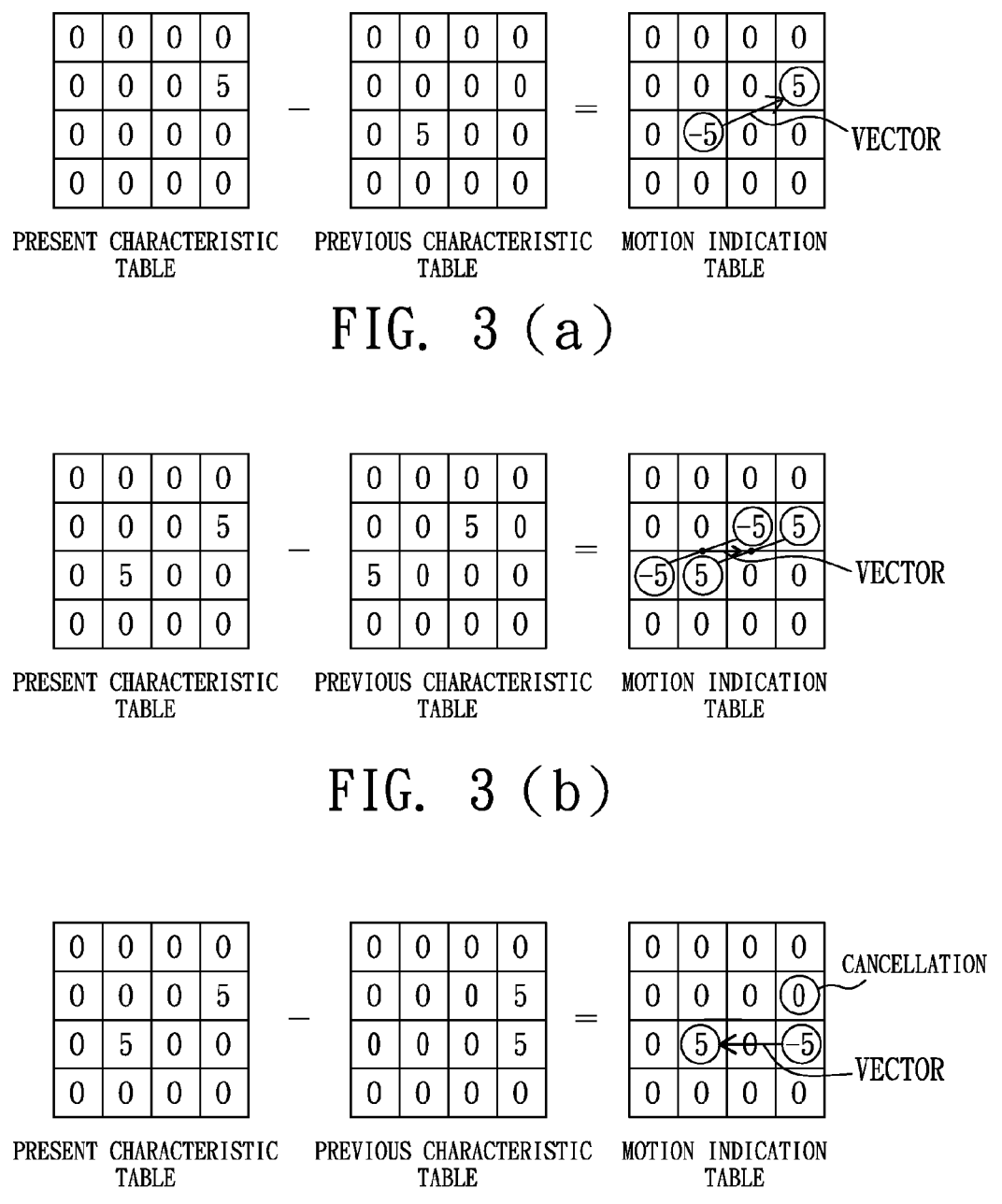

Please refer to FIG. 3(a), which illustrates how the motion indication table of the present invention is generated by a subtraction operation on two consecutive ones of the characteristic tables according to a scenario. With the two thresholds set at −3 and 3, "−5" is determined as the first characteristic data, and "5" is determined as the second characteristic data. The multi dimensional space can be determined by a predicted location generated by a combination of the location of "5" and a vector from "−5" to "5"—for example, take the blocks of 3×3 with the predicted location at center as the multi dimensional space for next scan—to increase scan efficiency.

Please refer to FIG. 3(b), which illustrates how the motion indication table of the present invention is generated by a subtraction operation on two consecutive ones of the characteristic tables according to another scenario. With two thresholds set at −3 and 3, "−5" is determined as the first characteristic data, and "5" is determined as the second characteristic data. The present invention generates a vector originating from the center of two "−5"s and ending at the center of two "5"s, and the multi dimensional spaces can be determined by two predicted locations generated by a combination of the locations of "5" and the vector.

Please refer to FIG. 3(c), which illustrates how the motion indication table of the present invention is generated by a subtraction operation on two consecutive ones of the characteristic tables according to still another scenario. In FIG. 3(c), two "5"s cancel each other in the subtraction operation. This effect implies that the motion indication table of the present invention is capable of removing static background sensed data, which correspond to noise or motionless points, and leaving only dynamic operation information.

To generate the predicted location more precisely, the present invention can further take the difference of two consecutive ones of the vectors into account. For example, given the present location of an object as $(x_n, y_n)$, the vector at present as (2,0), and the vector in the previous scan as (1,0), the predicted location can be determined as $(x_{n+1}, y_{n+1})=(x_n, y_n)+(2,0)+[(2,0)-(1,0)]$. As a result, the method for object location detection as illustrated in FIG. 1 can further include the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining a vector according to the at least one first characteristic data and the at least one second characteristic data;

generating a difference vector according to two consecutive ones of the vectors;

generating at least one predicted location according to a combination of the at least one second characteristic data, the vector, and the difference vector;

determining at least one space as the multi dimensional space according to the at least one predicted location; and transmitting a set of output data to a central processing unit, wherein the output data is selected from a group consisting of coordinate data, the output sensed data, the characteristic table, the motion indication table, and the difference vector.

In addition, the generation of the motion indication table and the difference vector can also be done by the central processing unit to relieve the workload of the multi dimensional sensing apparatus.

Figure 4:
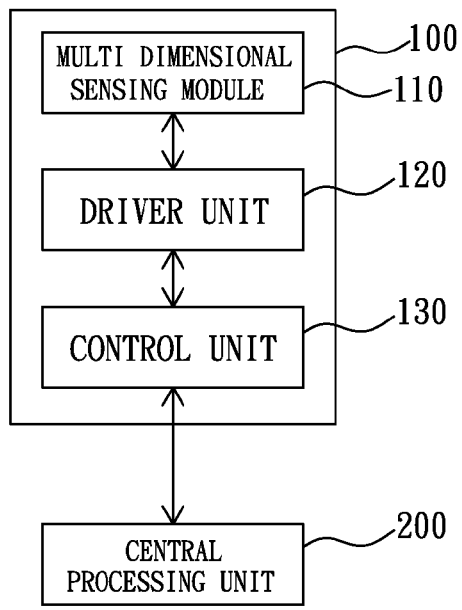
FIG. 4 illustrates the block diagram of a system for object location detection according to a preferred embodiment of the present invention.

Based on the foregoing methods, the present invention further proposes a system for object location detection. Please refer to FIG. 4, which illustrates the block diagram of a system for object location detection according to a preferred embodiment of the present invention. As illustrated in FIG. 4, the system has a multi dimensional sensing apparatus 100 and a central processing unit 200, wherein the multi dimensional sensing apparatus 100 has a multi dimensional sensing module 110, a driver unit 120, and a control unit 130.

The multi dimensional sensing module 110 can be one selected from a group consisting of capacitive touch sensor module, optical image sensing module, radio image sensing module, acoustic wave sensing module, electromagnetic sensing module, piezoelectrical sensing module, thermal sensing module, signal interruption sensing module, switch array type sensing module, and any combination thereof.

Figure 5:
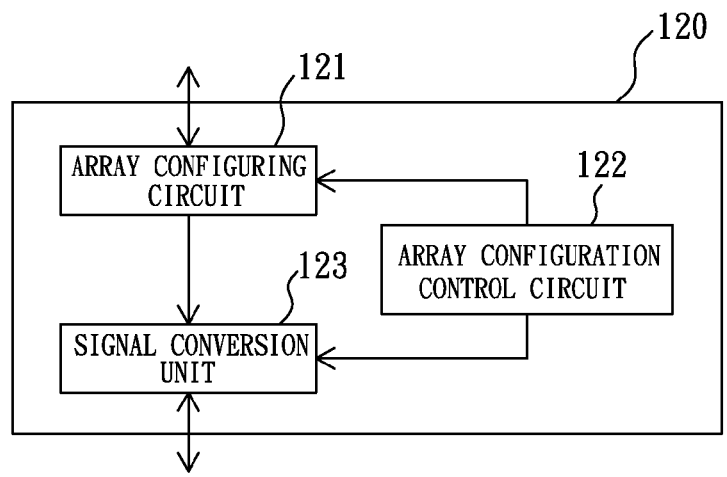
FIG. 5 illustrates the block diagram of a preferred embodiment of the driver unit in FIG. 4.

The driver unit 120 is coupled to the multi dimensional sensing module 110 for driving the multi dimensional sensing module 110 to perform a multi dimensional scan. Please refer to FIG. 5, which illustrates the block diagram of a preferred embodiment of the driver unit 120. As illustrated in FIG. 5, the driver unit 120 has an array configuring circuit 121, an array configuration control circuit 122, and a signal conversion unit 123.

The array configuring circuit 121 is coupled to the multi dimensional sensing module 110 to define a scan space for the multi dimensional sensing module 110.

The array configuration control circuit 122, coupled between the array configuring circuit 121 and the control unit 130, is used to control a connection configuration of the array configuring circuit 121 and a signal conversion operation of the control signal conversion unit 123.

The signal conversion unit 123, coupled between the array configuring circuit 121 and the control unit 130, is used to output the sensed values originating from the multi dimensional sensing module 110 under the control of the array configuration control circuit 122.

The control unit 130, coupled with the driver unit 120, is used for executing a program to drive the multi dimensional module 110 via the driver unit 120, to implement a method for object location detection in a space, the method including the steps of:

configuring the resolution of the multi dimensional sensing module 110 to divide a multi dimensional space into M first sub spaces, wherein M is a positive integer;

scanning the multi dimensional space to generate M first sensed data, which correspond to M first sensed values generated by the multi dimensional sensing module 110 in scanning the M first sub spaces; and performing a first comparison operation on the M first sensed data to locate at least one first locked space in the M first sub spaces, wherein each of the M first sensed values is an average of J sensed values generated by the multi dimensional sensing module 110 in scanning one of the M first sub spaces J times, wherein J is a positive integer;

configuring the resolution of the multi dimensional sensing module 110 to divide each of the at least one first locked space into N second sub spaces, wherein N is a positive integer;

scanning each of the at least one first locked space to generate at least one group of second sensed data, each group of the at least one group of second sensed data including N data, which correspond to N second sensed values generated by the multi dimensional sensing module 110 in scanning the N second sub spaces in one of the at least one first locked space; and performing a second comparison operation on each group of the at least one group of second sensed data to locate at least one second locked space in each of the at least one first locked space, wherein each of the N second sensed values is an average of K sensed values generated by the multi dimensional sensing module 110 in scanning one of the N second sub spaces K times, wherein K is a positive integer; and combining at least one of the M first sensed data that corresponds to the at least one first locked space, with the at least one group of second sensed data to form a set of output sensed data.

In one embodiment, the first comparison operation uses a first reference value to compare with each of the M first sensed data, so that when the numerical value of one of the M first sensed data is greater than the first reference value, a corresponding one of the M first sub spaces is defined as the first locked space; and the second comparison operation uses a second reference value to compare with each of the N second sensed data, so that when the numerical value of one of the N second sensed data is greater than the second reference value, a corresponding one of the N second sub spaces is defined as the second locked space.

In another embodiment, the first comparison operation compares each pair of two adjacent ones of the M first sensed data to find a first extreme value, and designate one of the M first sub spaces that corresponds to the first extreme value, as the first locked space, wherein the first extreme value can be the maximum or the minimum among the M first sensed data; and the second comparison operation compares each pair of two adjacent ones of the N second sensed data to find a second extreme value, and designate one of the N second sub spaces that corresponds to the second extreme value, as the second locked space, wherein the second extreme value can be the maximum or the minimum among the N second sensed data.

In another embodiment, the method for object location detection in a space using the control unit 130 further includes the steps of:

using a threshold to perform a comparison procedure on a set of the output sensed data to generate a characteristic table, which has at least one characteristic data, and determine at least one space as the multi dimensional space according to the at least one characteristic data; and transmitting a set of output data to the central processing unit 200, wherein the output data is selected from a group consisting of coordinate data, the output sensed data, and the characteristic table.

In another embodiment, the method for object location detection in a space using the control unit 130 further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining at least one space as the multi dimensional space according to the at least one first characteristic data and the at least one second characteristic data; and transmitting a set of output data to the central processing unit 200, wherein the output data is selected from a group consisting of coordinate data, the output sensed data, the characteristic table, and the motion indication table.

Besides, the generation of the motion indication table can also be done by the central processing unit 200 to relieve the workload of the control unit 130.

In still another embodiment, the method for object location detection in a space using the control unit 130 further includes the steps of:

using a threshold to perform a comparison procedure on two sets of the output sensed data to generate two characteristic tables, each having at least one characteristic data;

performing a subtraction operation on the two characteristic tables to generate a motion indication table;

using two thresholds to perform a comparison procedure on the motion indication table to find at least one first characteristic data and at least one second characteristic data;

determining a vector according to the at least one first characteristic data and the at least one second characteristic data;

generating a difference vector according to two consecutive ones of the vectors;

generating at least one predicted location according to a combination of the at least one second characteristic data, the vector, and the difference vector;

determining at least one space as the multi dimensional space according to the at least one predicted location; and transmitting a set of output data to the central processing unit 200, wherein the output data is selected from a group consisting of coordinate data, the output sensed data, the characteristic table, the motion indication table, and the difference vector.

In addition, the generation of the motion indication table and the difference vector can also be done by the central processing unit 200 to relieve the workload of the control unit 130.

Figure 6:
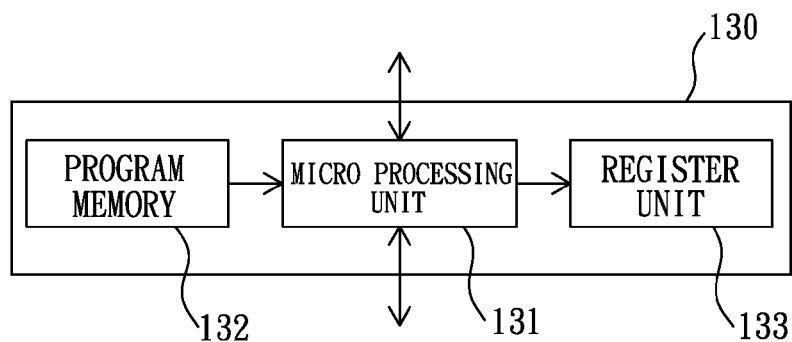
FIG. 6 illustrates the block diagram of a preferred embodiment of the control unit in FIG. 4.

FIG. 6 illustrates the block diagram of a preferred embodiment of the control unit 130. As illustrated in FIG. 6, the control unit 130 has a micro processing unit 131, a program memory 132, and a register unit 133.

The micro processing unit 131, coupled with the driver unit, is used for executing the program.

The program memory 132, coupled to the micro processing unit, is used for storing the program.

The register unit 133, coupled to the micro processing unit 131, is used for storing a plurality of the first sensed values, a plurality of the second sensed values, and a plurality of the output sensed data.

The present invention thus has the following advantages due to its novel design:

1. The present invention is capable of configuring a multi dimensional sensing apparatus to get multiple sets of sensed data of different resolutions, and using the multi dimensional sensing apparatus to combine the multiple sets of sensed data of different resolutions to generate a set of output sensed data.

2. The present invention is capable of using a multi dimensional sensing apparatus to perform an averaging operation on the multiple sets of sensed data to enhance the signal-to-noise ratio of the sensed data.

3. The present invention is capable of using a multi dimensional sensing apparatus to perform a comparison procedure to convert a set of output sensed data into a characteristic table, and perform a location prediction procedure to determine a scan space for next scan procedure according to the characteristic table.

4. The present invention is capable of using a multi dimensional sensing apparatus to perform a subtraction operation to convert two characteristic tables into a motion indication table and thereby remove static background sensed data, and perform a location prediction procedure to determine at least one scan space for next scan procedure.

In conclusion, the present invention's method and system for object location detection in a space is capable of efficiently detecting the location and moving trace of at least one object in a multi dimensional space. Therefore, the present invention possesses superior advantages.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A method for object location detection in a space, the method including the steps of:
configuring the resolution of a multi dimensional sensing apparatus to divide a multi dimensional space into M first sub spaces, wherein M is a positive integer;
using said multi dimensional sensing apparatus to scan said multi dimensional space to generate M first sensed data, which correspond to M first sensed values generated by said multi dimensional sensing apparatus in scanning said M first sub spaces; and performing a first comparison operation on said M first sensed data to locate at least one first locked space in said M first sub spaces;
configuring the resolution of said multi dimensional sensing apparatus to divide each of said at least one first locked space into N second sub spaces, wherein N is a positive integer;
using said multi dimensional sensing apparatus to scan each of said at least one first locked space to generate at least one group of second sensed data, each group of said at least one group of second sensed data including N data which correspond to N second sensed values generated by said multi dimensional sensing apparatus in scanning said N second sub spaces in one of said at least one first locked space; and performing a second comparison operation on each group of said at least one group of second sensed data to locate at least one second locked space in each of said at least one first locked space; and
using said multi dimensional sensing apparatus to combine at least one of said M first sensed data that corresponds to said at least one first locked space, with said at least one group of second sensed data to form a set of output sensed data.

2. The method for object location detection in a space as claim 1, wherein said multi dimensional sensing apparatus is one selected from a group consisting of capacitive touch sensor apparatus, optical image sensing apparatus, radio image sensing apparatus, acoustic wave sensing apparatus, electromagnetic sensing apparatus, piezoelectrical sensing apparatus, thermal sensing apparatus, signal interruption sensing apparatus, switch array type sensing apparatus, and any combination thereof.

3. The method for object location detection in a space as claim 1, wherein each of said M first sensed values is an average of J sensed values generated by said multi dimensional sensing apparatus in scanning one of said M first sub spaces J times, wherein J is a positive integer; and each of said N second sensed values is an average of K sensed values generated by said multi dimensional sensing apparatus in scanning one of said N second sub spaces K times, wherein K is a positive integer.

4. The method for object location detection in a space as claim 1, wherein said first comparison operation uses a first reference value to compare with each of said M first sensed data, so that when the numerical value of one of said M first sensed data is greater than said first reference value, a corresponding one of said M first sub spaces is defined as said first locked space; and said second comparison operation uses a second reference value to compare with each of said N second sensed data, so that when the numerical value of one of said N second sensed data is greater than said second reference value, a corresponding one of said N second sub spaces is defined as said second locked space.

5. The method for object location detection in a space as claim 1, wherein said first comparison operation compares each pair of two adjacent ones of said M first sensed data to find a first extreme value, and designate one of said M first sub spaces that corresponds to said first extreme value, as said first locked space, wherein said first extreme value is the maximum or the minimum among said M first sensed data; and said second comparison operation compares each pair of two adjacent ones of said N second sensed data to find a second extreme value, and designate one of said N second sub spaces that corresponds to said second extreme value, as said second locked space, wherein said second extreme value is the maximum or the minimum among said N second sensed data.

6. The method for object location detection in a space as claim 1, further comprising the steps of:
using a threshold to perform a comparison procedure on a set of said output sensed data to generate a characteristic table, which has at least one characteristic data, and determine at least one space as said multi dimensional space according to said at least one characteristic data; and
transmitting a set of output data to a central processing unit, wherein said output data is selected from a group consisting of coordinate data, said output sensed data, and said characteristic table.

7. The method for object location detection in a space as claim 1, further comprising the steps of:
using a threshold to perform a comparison procedure on two sets of said output sensed data to generate two characteristic tables, each having at least one characteristic data;
performing a subtraction operation on said two characteristic tables to generate a motion indication table;
using two thresholds to perform a comparison procedure on said motion indication table to find at least one first characteristic data and at least one second characteristic data;
determining at least one space as said multi dimensional space according to said at least one first characteristic data and said at least one second characteristic data; and
transmitting a set of output data to a central processing unit, wherein said output data is selected from a group consisting of coordinate data, said output sensed data, said characteristic table, and said motion indication table.

8. The method for object location detection in a space as claim 1, further comprising the steps of:
sing a threshold to perform a comparison procedure on two sets of said output sensed data to generate two characteristic tables, each having at least one characteristic data;
performing a subtraction operation on said two characteristic tables to generate a motion indication table;
using two thresholds to perform a comparison procedure on said motion indication table to find at least one first characteristic data and at least one second characteristic data;
determining a vector according to said at least one first characteristic data and said at least one second characteristic data;
generating a difference vector according to two consecutive ones of said vectors;
generating at least one predicted location according to a combination of said at least one second characteristic data, said vector, and said difference vector;
determining at least one space as said multi dimensional space according to said at least one predicted location; and transmitting a set of output data to a central processing unit, wherein said output data is selected from a group consisting of coordinate data, said output sensed data, said characteristic table, said motion indication table, and said difference vector.

9. A method for object location detection in a space, the method including the steps of:
configuring the resolution of a multi dimensional sensing apparatus to divide a multi dimensional space into M first sub spaces, wherein M is a positive integer;
using said multi dimensional sensing apparatus to scan said multi dimensional space to generate M first sensed data, which correspond to M first sensed values generated by said multi dimensional sensing apparatus in scanning said M first sub spaces; and performing a first comparison operation on said M first sensed data to locate at least one first locked space in said M first sub spaces, wherein each of said M first sensed values is an average of J sensed values generated by said multi dimensional sensing apparatus in scanning one of said M first sub spaces J times, wherein J is a positive integer;
configuring the resolution of said multi dimensional sensing apparatus to divide each of said at least one first locked space into N second sub spaces, wherein N is a positive integer;
using said multi dimensional sensing apparatus to scan each of said at least one first locked space to generate at least one group of second sensed data, each group of said at least one group of second sensed data including N data which correspond to N second sensed values generated by said multi dimensional sensing apparatus in scanning said N second sub spaces in one of said at least one first locked space; and performing a second comparison operation on each group of said at least one group of second sensed data to locate at least one second locked space in each of said at least one first locked space, wherein each of said N second sensed values is an average of K sensed values generated by said multi dimensional sensing apparatus in scanning one of said N second sub spaces K times, wherein K is a positive integer; and
using said multi dimensional sensing apparatus to combine at least one of said M first sensed data that corresponds to said at least one first locked space, with said at least one group of second sensed data to form a set of output sensed data.

10. The method for object location detection in a space as claim 9, wherein said multi dimensional sensing apparatus is one selected from a group consisting of capacitive touch sensor apparatus, optical image sensing apparatus, radio image sensing apparatus, acoustic wave sensing apparatus, electromagnetic sensing apparatus, piezoelectrical sensing apparatus, thermal sensing apparatus, signal interruption sensing apparatus, switch array type sensing apparatus, and any combination thereof.

11. The method for object location detection in a space as claim 9, wherein said first comparison operation uses a first reference value to compare with each of said M first sensed data, so that when the numerical value of one of said M first sensed data is greater than said first reference value, a corresponding one of said M first sub spaces is defined as said first locked space; and said second comparison operation uses a second reference value to compare with each of said N second sensed data, so that when the numerical value of one of said N second sensed data is greater than said second reference value, a corresponding one of said N second sub spaces is defined as said second locked space.

12. The method for object location detection in a space as claim 9, wherein said first comparison operation compares each pair of two adjacent ones of said M first sensed data to find a first extreme value, and designate one of said M first sub spaces, which corresponds to said first extreme value, as said first locked space, wherein said first extreme value is the maximum or the minimum among said M first sensed data; and said second comparison operation compares each pair of two adjacent ones of said N second sensed data to find a second extreme value, and designate one of said N second sub spaces, which corresponds to said second extreme value, as said second locked space, wherein said second extreme value is the maximum or the minimum among said N second sensed data.

13. The method for object location detection in a space as claim 9, further comprising the steps of:
using a threshold to perform a comparison procedure on a set of said output sensed data to generate a characteristic table, which has at least one characteristic data, and determine at least one space as said multi dimensional space according to said at least one characteristic data; and
transmitting a set of output data to a central processing unit, wherein said output data is selected from a group consisting of coordinate data, said output sensed data, and said characteristic table.

14. The method for object location detection in a space as claim 9, further comprising the steps of:
using a threshold to perform a comparison procedure on two sets of said output sensed data to generate two characteristic tables, each having at least one characteristic data;
performing a subtraction operation on said two characteristic tables to generate a motion indication table;
using two thresholds to perform a comparison procedure on said motion indication table to find at least one first characteristic data and at least one second characteristic data;
determining at least one space as said multi dimensional space according to said at least one first characteristic data and said at least one second characteristic data; and
transmitting a set of output data to a central processing unit, wherein said output data is selected from a group consisting of coordinate data, said output sensed data, said characteristic table, and said motion indication table.

15. The method for object location detection in a space as claim 9, further comprising the steps of:
using a threshold to perform a comparison procedure on two sets of said output sensed data to generate two characteristic tables, each having at least one characteristic data;
performing a subtraction operation on said two characteristic tables to generate a motion indication table;
using two thresholds to perform a comparison procedure on said motion indication table to find at least one first characteristic data and at least one second characteristic data;
determining a vector according to said at least one first characteristic data and said at least one second characteristic data;
generating a difference vector according to two consecutive ones of said vectors;
generating at least one predicted location according to a combination of said at least one second characteristic data, said vector, and said difference vector;

determining at least one space as said multi dimensional space according to said at least one predicted location; and transmitting a set of output data to a central processing unit, wherein said output data is selected from a group consisting of coordinate data, said output sensed data, said characteristic table, said motion indication table, and said difference vector.

16. A system for object location detection in a space, the system comprising:

a multi dimensional sensing module;

a driver unit, coupled with said multi dimensional sensing module; and a control unit, coupled with said driver unit;

wherein said control unit is used for executing a program to drive said multi dimensional sensing module via said driver unit, to implement a method for object location detection in a space, which includes the steps of:

configuring the resolution of the multi dimensional sensing module to divide a multi dimensional space into M first sub spaces, wherein M is a positive integer;

scanning said multi dimensional space to generate M first sensed data, which correspond to M first sensed values generated by said multi dimensional sensing module in scanning said M first sub spaces; and performing a first comparison operation on said M first sensed data to locate at least one first locked space in said M first sub spaces, wherein each of said M first sensed values is an average of J sensed values generated by said multi dimensional sensing module in scanning one of said M first sub spaces J times, wherein J is a positive integer;

configuring the resolution of said multi dimensional sensing module to divide each of said at least one first locked space into N second sub spaces, wherein N is a positive integer;

scanning each of said at least one first locked space to generate at least one group of second sensed data, each group of said at least one group of second sensed data including N data, which correspond to N second sensed values generated by said multi dimensional sensing module in scanning the N second sub spaces in one of the at least one first locked space; and performing a second comparison operation on each group of said at least one group of second sensed data to locate at least one second locked space in each of said at least one first locked space, wherein each of said N second sensed values is an average of K sensed values generated by said multi dimensional sensing module in scanning one of said N second sub spaces K times, wherein K is a positive integer; and combining at least one of said M first sensed data that corresponds to said at least one first locked space, with said at least one group of second sensed data to form a set of output sensed data.

17. The system for object location detection in a space as claim 16, wherein said multi dimensional sensing module is one selected from a group consisting of capacitive touch sensor module, optical image sensing module, radio image sensing module, acoustic wave sensing module, electromagnetic sensing module, piezoelectrical sensing module, thermal sensing module, signal interruption sensing module, switch array type sensing module, and any combination thereof.

18. The system for object location detection in a space as claim 16, wherein said driver unit includes:

an array configuring circuit, coupled with said multi dimensional sensing module;

an array configuration control circuit, coupled between said array configuring circuit and said control unit; and a signal conversion unit, coupled between said array configuring circuit and said control unit for outputting said first sensed value and said second sensed value.

19. The system for object location detection in a space as claim 16, wherein said control unit comprises:

a micro processing unit, coupled with said driver unit;

a program memory, coupled with said micro processing unit; and a register unit, coupled with said micro processing unit for storing a plurality of said first sensed values, a plurality of said second sensed values, and a plurality of said output sensed data.

20. The system for object location detection in a space as claim 16, wherein said first comparison operation uses a first reference value to compare with each of said M first sensed data, so that when the numerical value of one of said M first sensed data is greater than said first reference value, a corresponding one of said M first sub spaces is defined as said first locked space; and said second comparison operation uses a second reference value to compare with each of said N second sensed data, so that when the numerical value of one of said N second sensed data is greater than said second reference value, a corresponding one of said N second sub spaces is defined as said second locked space.

21. The system for object location detection in a space as claim 16, wherein said first comparison operation compares each pair of two adjacent ones of said M first sensed data to find a first extreme value, and designate one of said M first sub spaces that corresponds to said first extreme value, as said first locked space, wherein said first extreme value is the maximum or the minimum among said M first sensed data; and said second comparison operation compares each pair of two adjacent ones of said N second sensed data to find a second extreme value, and designate one of said N second sub spaces that corresponds to said second extreme value, as said second locked space, wherein said second extreme value is the maximum or the minimum among said N second sensed data.

22. The system for object location detection in a space as claim 16, wherein said method for object location detection in a space further includes the steps of:

using a threshold to perform a comparison procedure on a set of said output sensed data to generate a characteristic table, which has at least one characteristic data, and determine at least one space as said multi dimensional space according to said at least one characteristic data; and transmitting a set of output data to a central processing unit, wherein said output data is selected from a group consisting of coordinate data, said output sensed data, and said characteristic table.

23. The system for object location detection in a space as claim 16, wherein said method for object location detection in a space further includes the steps of:

using a threshold to perform a comparison procedure on two sets of said output sensed data to generate two characteristic tables, each having at least one characteristic data;

performing a subtraction operation on said two characteristic tables to generate a motion indication table;

using two thresholds to perform a comparison procedure on said motion indication table to find at least one first characteristic data and at least one second characteristic data;

determining at least one space as said multi dimensional space according to said at least one first characteristic data and said at least one second characteristic data; and transmitting a set of output data to a central processing unit, wherein said output data is selected from a group consisting of coordinate data, said output sensed data, said characteristic table, and said motion indication table.

24. The system for object location detection in a space as claim 16, wherein said method for object location detection in a space further includes the steps of:

using a threshold to perform a comparison procedure on two sets of said output sensed data to generate two characteristic tables, each having at least one characteristic data;

performing a subtraction operation on said two characteristic tables to generate a motion indication table;

using two thresholds to perform a comparison procedure on said motion indication table to find at least one first characteristic data and at least one second characteristic data;

determining a vector according to said at least one first characteristic data and said at least one second characteristic data;

generating a difference vector according to two consecutive ones of said vectors;

generating at least one predicted location according to a combination of said at least one second characteristic data, said vector, and said difference vector;

determining at least one space as said multi dimensional space according to said at least one predicted location; and transmitting a set of output data to a central processing unit, wherein said output data is selected from a group consisting of coordinate data, said output sensed data, said characteristic table, said motion indication table, and said difference vector.

* * * * *